Figure 1:
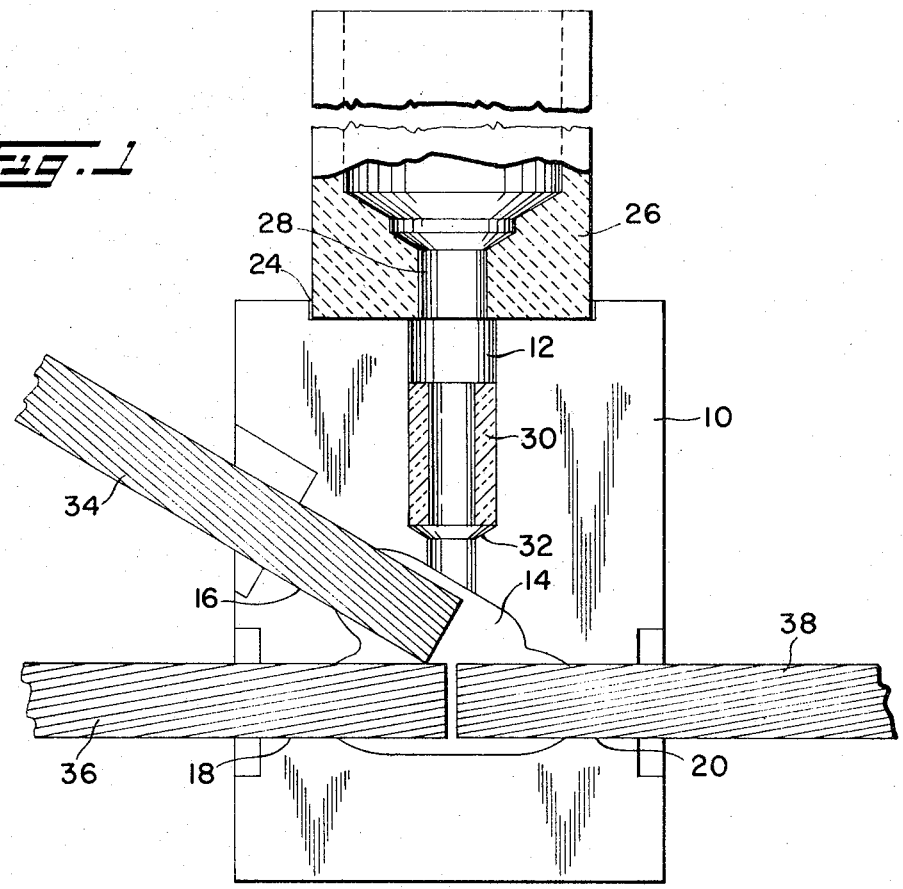

United States Patent [19]
Gelfand

[11] 3,782,677
[45] Jan. 1, 1974

[54] CABLE AND LIKE SPLICING APPARATUS

[75] Inventor: Leonard Gelfand, Chagrin Falls, Ohio

[73] Assignee: Erico Products, Inc., Cleveland, Ohio

[22] Filed: Apr. 5, 1971

[21] Appl. No.: 131,069

[52] U.S. Cl.............. 249/97, 249/98, 249/111, 164/54, 164/138, 249/95, 164/410, 164/337
[51] Int. Cl............................................. B22d 19/04
[58] Field of Search .............. 249/97, 98, 96, 105, 249/95, 90, 86; 164/111, 105, 244, 54, 410, 337

[56] References Cited
UNITED STATES PATENTS

| 3,554,270 | 1/1971 | Gelfand | 249/98 |
| 3,480,070 | 11/1969 | Beetle et al. | 249/105 |
| 3,162,912 | 12/1964 | Sylvester | 249/105 |
| 2,198,498 | 4/1940 | Hagemeyer | 164/244 X |
| R12,703 | 10/1907 | Corcoran | 249/105 X |
| 2,482,352 | 9/1949 | Litton | 249/105 |
| 126,015 | 4/1872 | Brunner | 249/105 |
| 1,300,723 | 4/1919 | Gutmueller | 249/105 |
| 1,484,076 | 2/1924 | Perry | 249/105 |

FOREIGN PATENTS OR APPLICATIONS 16,739 11/1915 Great Britain ............... 249/96

Primary Examiner—J. Spencer Overholser
Assistant Examiner—V. K. Rising
Attorney—Oberlin, Maky, Donnelly & Renner

[57] ABSTRACT

A graphite mold for use in joining cable parts having a weld cavity in which the component parts are received, a sprue opening for induction of molten metal into the cavity to join the parts, and a thermal insulation sleeve within the sprue opening for minimizing heat transfer between the molten metal and the graphite mold.

2 Claims, 2 Drawing Figures

PATENTED JAN 1 1974　　　　　　　　　　　　　　3,782,677

INVENTOR.
LEONARD GELFAND
BY
Oberlin, Maky, Donnelly & Renner
ATTORNEYS

CABLE AND LIKE SPLICING APPARATUS

The present invention relates as indicated to a graphite mold used for joining cable parts and more particularly to a mold which produces a void free weld.

Conventional graphite molds for cable splicing have a sprue opening through which molten metal is conducted to a weld cavity. As the molten metal passes through the sprue opening, the direct contact of such metal with the graphite mold causes rapid heat transfer. Such heat transfer results in freezing of the metal in the sprue opening prior to freezing of the metal in the weld cavity which consequently inhibits further flow to the weld cavity. Therefore, on solidification the weld may be formed irregularly with shrinkage void spaces therein.

In high voltage cables, for example above 15,000 volts, the void spaces formed in the connecting weld may cause resultant deterioration or puncturing of the surrounding insulation. This deterioration or puncturing is caused by ionization of gases trapped within the connector void and/or insulation.

Attempts have been made to eliminate this problem through the use of relatively large sprue openings or risers, but this embodiment does not adequately solve the problem since there is still direct metal to graphite contact in the riser which causes rapid solidification with at least partial plugging. Only when the diameter of the riser is selected so as to be larger than the diameter of the weld cavity may a uniform connective weld be obtained upon injection of the molten metal. This method is objectionable however since the resultant weld has a large diameter riser which must be trimmed off by use of hand tools and the entire composite cable connection dressed down to a regular, smooth appearance for re-insulating.

Accordingly, the primary object of the present invention is to provide a mold which will develop a void free connective weld for cable parts.

Another important object is to produce a void free weld with a relatively small diameter sprue opening in the graphite mold.

Still another object of the present invention is to reduce the amount of heat transmission from the molten metal to the graphite mold by insertion of a thermal insulation shield or sleeve in the sprue opening adjacent to the weld cavity or chamber. Preferably, the thermal insulation shield is a refractory, ceramic insert.

Other objects and advantages of the present invention will become apparent as the following description proceeds.

To the accomplishment of the foregoing and related ends, the invention, then, comprises the features hereinafter fully described, the following description and the annexed drawing setting forth in detail a certain illustrative embodiment of the invention, this being indicative, however, of but one of the various ways in which the principle of the invention may be employed.

Figure 2:
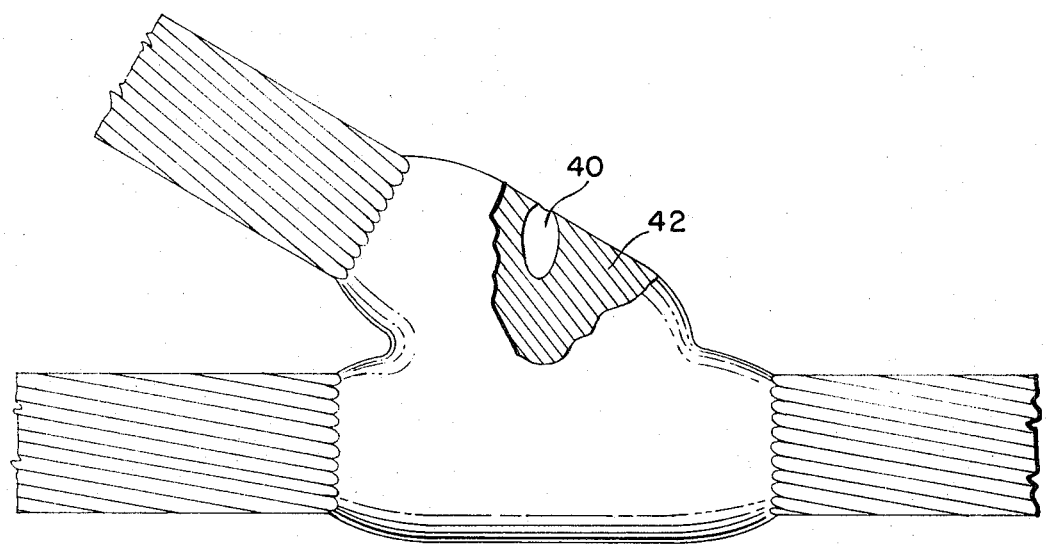

In the drawing:

FIG. 1 is a vertical elevation partially in section of the graphite mold of the present invention; and FIG. 2 is an elevation of a prior art connection partially broken away to show a void in the connective weld.

Referring in detail to the drawing and initially to FIG. 1, a graphite mold half 10 constructed according to the present invention is illustrated. The mold halves are joined on the parting face toward the viewer in conventional manner and correspond to each other in right and left hand fashion. Such mold half includes a riser or sprue opening 12, a chamber or weld cavity 14 and apertures 16, 18 and 20 for receiving the cable parts to be joined. The top surface of the graphite mold formed by the halves 10 is provided with a shallow recess 24 for receiving crucible 26, with tap hole 28 thereby aligned with sprue opening 12. A thermal insulation shield 30, preferably of a ceramic material, is positioned in sprue opening 12 on shoulder 32 adjacent the welding chamber 14. The particular ceramic material used may vary depending on the metal being cast. Examples of suitable materials would be fire clay, Kaolin, fusion cast or sintered high alumina materials, coarse sand or silicas, fired or cast magnesias, zircon or silicon carbide.

In operation, three cable parts 34, 36 and 38 are placed in apertures 16, 18 and 20 of the mold formed by the halves 10. The crucible 26 is positioned in recess 24 and a metallic powder composition is ignited in crucible 26 and the molten metal thus formed runs into sprue opening 12 and thence into chamber 14. The thermal insulation shield or sleeve 30 inhibits heat transfer from the metal to the mold thereby maintaining a relatively free flow path through riser 12 throughout the casting process. Sufficient molten metal passes into the riser 12 to fill cavity 14. Upon solidification, the mold is removed, the small diameter riser is trimmed off, the cable splice is dressed down to a regular, smooth appearance, and the resultant Y-shaped cable splice is insulated.

By providing a continuously free flow path, the molten metal used to join the three cable parts uniformly fills welding chamber 14. This precludes the formation of any void spaces such as 40 in the prior art weld 42 depicted in FIG. 2, thereby eliminating ionization of entrapped gases with resultant deterioration of insulation.

A new insulation sleeve 30 may be employed for each casting if required. It will also be appreciated that molten metal may be ladled directly into the mold through a pouring basin rather than cast from the crucible illustrated.

Other modes of applying the principle of the invention may be employed, change being made as regards the details described, provided the features stated in any of the following claims, or the equivalent of such be employed.

I, therefore, particularly point out and distinctly claim as my invention:

1. In combination, a multi-part graphite mold having a substantially vertical parting plane and including a chamber adapted to receive members to be joined such as high voltage electrical cables, a small diameter vertically extending sprue opening formed along said parting plane for introduction of molten metal into said chamber to fill said chamber and join said members, a refractory ceramic sleeve in said sprue opening acting as a thermal insulation shield to prevent the formation of voids in said chamber as it is filled with molten metal and such metal solidified, and shoulder support means between said sleeve and mold for supporting said sleeve in said sprue opening.

2. The combination of claim 1 wherein said mold includes at least three apertures extending into said chamber for receiving said members to be joined.

* * * * *